United States Patent
Pfeifer et al.

(10) Patent No.: US 6,725,647 B2
(45) Date of Patent: Apr. 27, 2004

(54) EXHAUST GAS TREATMENT UNITS FOR INTERNAL COMBUSTION ENGINES AND PROCESSES FOR OPERATING THEM

(75) Inventors: Marcus Pfeifer, Solingen (DE); Barry Van Setten, Rodenbach (DE); Jurgen Gieshoff, Biebergemund (DE); Paul Spurk, Bad Konig (DE); Egbert Lox, Hanau (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 10/058,685

(22) Filed: Jan. 28, 2002

(65) Prior Publication Data

US 2002/0116920 A1 Aug. 29, 2002

(30) Foreign Application Priority Data

Jan. 30, 2001 (DE) .......................... 101 04 160

(51) Int. Cl.$^7$ ................................. F01N 3/00
(52) U.S. Cl. .................. 60/274; 60/297; 60/299; 60/301; 423/213.2; 423/237; 422/171
(58) Field of Search .................. 60/274, 285, 297, 60/299, 301, 302, 286; 423/213.2, 237, 239.1; 422/170, 171

(56) References Cited

U.S. PATENT DOCUMENTS

| | | | |
|---|---|---|---|
| 5,461,857 A | * | 10/1995 | Itou et al. ............... 60/276 |
| 5,727,385 A | * | 3/1998 | Hepburn ............... 60/297 |
| 5,746,052 A | * | 5/1998 | Kinugasa et al. ............ 60/274 |
| 5,783,160 A | * | 7/1998 | Kinugasa et al. ............ 423/237 |
| 6,254,842 B1 | * | 7/2001 | Hu et al. ............... 423/213.5 |
| 6,345,496 B1 | * | 2/2002 | Fuwa et al. ............... 60/274 |

FOREIGN PATENT DOCUMENTS

| | | |
|---|---|---|
| DE | 198 20 282 | 5/1998 |
| DE | 198 20 682 | 5/1998 |
| EP | 0 283 913 | 9/1988 |
| EP | 0 701 858 | 3/1996 |
| EP | 0 723 805 | 7/1996 |
| EP | 0 773 354 | 5/1997 |
| EP | 0 957 242 | 11/1999 |
| EP | 1 023 935 | 8/2000 |

* cited by examiner

*Primary Examiner*—Binh Tran
(74) *Attorney, Agent, or Firm*—Kalow & Springut LLP

(57) ABSTRACT

The present invention provides an exhaust gas treatment unit for an internal combustion engine. A first catalyst unit produces ammonia from corresponding constituents in a rich exhaust gas composition. A second catalyst unit that is located downstream of the first catalyst unit temporarily stores the ammonia produced by the first catalyst unit in the presence of a rich exhaust gas composition. In the presence of a lean exhaust gas composition, the nitrogen oxides present in the exhaust gas are subjected to a reduction reaction using the temporarily stored ammonia as reducing agent. The exhaust gas treatment unit also contains a third catalyst unit that is located between the other two catalyst units, and oxidizes the nitrogen oxides present in the exhaust gas at lean exhaust gas conditions to a such an extent that 25 to 75 vol. % of the nitrogen oxides entering the second catalyst unit consist of nitrogen dioxide.

16 Claims, 1 Drawing Sheet

EXHAUST GAS TREATMENT UNITS FOR INTERNAL COMBUSTION ENGINES AND PROCESSES FOR OPERATING THEM

FIELD OF THE INVENTION

The present invention relates to the field of exhaust gas treatment.

BACKGROUND OF THE INVENTION

Recently, in order to reduce fuel consumption, the motor vehicle industry has developed gasoline engines that operate with lean air/fuel mixtures. An air/fuel mixture is considered to be lean when it contains more oxygen than would be required for complete combustion of the fuel. By contrast, in a rich air/fuel mixture, there is less oxygen than is required for complete combustion of the fuel. Engines that run on lean air/fuel mixtures are referred to as lean-burn engines.

For the quantitative representation of the relationship of the amount of air to fuel that is supplied to an engine, the air/fuel ratio or normalized air/fuel ratio lambda ($\lambda$) is used. The air/fuel ratio indicates how many kilograms of air per kilogram of fuel are supplied to the engine. For stoichiometric combustion, the air/fuel ratio for conventional engine fuels is 14.7. The associated normalized air/fuel ratio $\lambda$ is the air/fuel ratio normalized to stoichiometric conditions, and therefore has the value 1.0 for a stoichiometrically composed air/fuel mixture. The air/fuel ratio of the exhaust gas leaving the engine is the same as the air/fuel ratio of the fuel supplied to the engine when no selective storage processes for specific exhaust gas components occur in the engine.

Lean-burn engines run with air/fuel ratios corresponding to normalized air/fuel ratios of more than 1.3 under normal operation. The oxygen content of the exhaust gas from these engines is usually between 3 vol. % and 15 vol. %. When accelerating and also under full load, stoichiometric, or slightly rich air/fuel mixtures are also supplied to lean-burn engines in order to be able to provide the high power required.

The treatment of exhaust gases from lean-burn engines causes considerable problems. When operating lean-burn engines, nitrogen oxides present in the exhaust gas under lean operation cannot be reduced via a chemical route due to the high oxygen concentration in the exhaust gas. Usually, from about 60 vol. % to about 95 vol. % of the nitrogen oxides present in the exhaust gas consist of nitrogen monoxide, depending on the operating status of the engine. The remainder is made up of nitrogen dioxide and other nitrogen oxides.

To solve the exhaust gas problems associated with lean-burn engines, it has been suggested that the nitrogen oxides be converted to nitrogen and water using the principle of selective catalytic reduction, which makes use of ammonia and the oxygen present in lean exhaust gases, on a suitable catalyst, such as an SCR catalyst. This type of catalyst contains, for example zeolites, silicon dioxide, aluminium oxide and/or titanium oxide as support material for copper, iron, platinum, palladium and/or rhodium, vanadium and/or tungsten and also always has a certain storage capacity for ammonia.

It is also known in the art that in order to improve the reduction of nitrogen oxides in lean exhaust gases from internal combustion engines, the concentration of nitrogen dioxide in the exhaust gas may first be increased to 50 vol. %. This knowledge is described in DE 198 20 682 A1, which is incorporated by reference herein. The concentration is increased by oxidation of nitrogen monoxide to nitrogen dioxide in an electric gas discharge. The treated exhaust gas is then passed over an SCR catalyst, while a reducing agent, preferably ammonia, is supplied. Catalysts known from denitrifying the waste gas of power stations and also copper cation exchanged ZSM-5 zeolites are mentioned as suitable SCR catalysts.

It has also been proposed that the ammonia required for the SCR reaction be synthesized on board a motor vehicle from constituents of the exhaust gas. This proposal was described in EP 0 773 354 A1, which is incorporated by reference herein. For this purpose, the exhaust gas is passed over a three-way catalyst and then over an SCR catalyst, and the engine is operated alternately with lean and rich air/fuel mixtures. During operating phases with rich air/fuel mixtures, the three-way catalyst forms ammonia from the nitrogen oxides present in the exhaust gas, which is temporarily stored on the SCR catalyst. During operating phases with lean air/fuel mixtures, the nitrogen oxides present in the exhaust gas pass through the three-way catalyst virtually unchanged and are reduced to nitrogen and water by the ammonia adsorbed on the SCR catalyst.

A further development of this process has also been proposed. In this process, a third catalyst is introduced in the exhaust gas stream, upstream of the other two catalysts. This method is described in DE 198 20 828 A1, which is incorporated by reference herein. This third catalyst temporarily stores the nitrogen oxides present in the exhaust gas in the presence of a lean exhaust gas composition and releases it again in the presence of a rich exhaust gas composition. Due to the use of the much larger amounts of temporarily stored nitrogen oxides produced under lean operation than under rich operation, a correspondingly large amount of ammonia can be produced and temporarily stored in a particular rich combustion management phase. This provides for effective nitrogen oxide reduction in a subsequent lean operating phase. Overall, this should enable operation with a high proportion of lean phases and as a result with correspondingly low fuel consumption.

Although the aforementioned proposals lead to improved conversion of the nitrogen oxides emitted by lean-burn engines, a further improvement in nitrogen oxide conversion is required to comply with future exhaust gas standards. The object of the present invention is to provide an exhaust gas treatment unit that enables a further improvement in nitrogen oxide conversion in the exhaust gas from lean-burn engines.

SUMMARY OF THE INVENTION

The present invention provides an exhaust gas treatment unit for internal combustion engines. A first catalyst unit produces ammonia from relevant exhaust gas constituents of a rich exhaust gas composition. A second catalyst unit, located downstream of the first catalyst unit, temporarily stores the ammonia produced by the first catalyst unit and under lean exhaust conditions, enables nitrogen oxides (NOx) present in the exhaust gas to undergo a reduction reaction using the temporarily stored ammonia as a reducing agent. Prior to introduction of the lean exhaust gas to the second catalyst unit, it is exposed to a third catalyst unit in which a portion of the nitrogen oxides is oxidized.

Thus, in one embodiment, the present invention provides an exhaust gas treatment unit for an internal combustion engine. The exhaust gas treatment unit comprises:

a. a first catalyst unit, wherein said first catalyst unit comprises a three-way catalyst;

b. a second catalyst unit, wherein said second catalyst unit is located downstream of the first catalyst unit and comprises an SCR-catalyst; and c. a third catalyst unit, wherein said third catalyst unit is located downstream of said first catalyst unit and upstream of said second catalyst unit, and said third catalyst unit is capable of oxidizing the nitrogen oxides present in the exhaust gas at lean exhaust gas conditions so that from 25 to 75 vol. % of the nitrogen oxides entering the second catalyst unit are nitrogen dioxide.

The present invention also provides a process that provides for an improved conversion of nitrogen oxides. Under one embodiment, the process comprises:

a. exposing a rich exhaust gas to a first catalyst unit to generate ammonia;

b. storing said ammonia of step (a) in a second catalyst unit, wherein said second catalyst unit is located downstream of said first catalyst unit;

c. exposing a lean exhaust gas to a third catalyst unit, wherein said third catalyst unit is located downstream of said first catalyst unit and upstream of said second catalyst unit, and wherein said lean exhaust gas comprises nitrogen oxides;

d. oxidizing said nitrogen oxides to form oxidized nitrogen oxides; and e. exposing said oxidized nitrogen oxides to said second catalyst unit.

For a better understanding of the present invention together with other and further advantages and embodiments, reference is made to the following description taken in conjunction with the examples, the scope of which is set forth in the appended claims.

BRIEF DESCRIPTION OF THE FIGURES

Preferred embodiments of the invention have been chosen for purposes of illustration and description but are not intended to restrict the scope of the invention in any way. The preferred embodiments of certain aspects of the invention are shown in the accompanying figures, wherein.

DETAILED DESCRIPTION OF THE INVENTION

Figure 1:
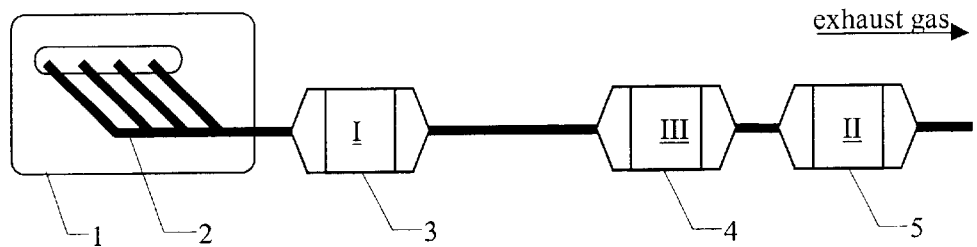
FIG. 1 illustrates an exhaust gas treatment unit with separate converter housings for the three catalyst units I to III.

The present invention provides an exhaust gas treatment unit for an internal combustion engine. In this treatment unit, there is a first catalyst unit that produces ammonia from relevant exhaust gas constituents of a rich exhaust gas composition and a second catalyst unit that is located downstream of the first catalyst unit and that temporarily stores the ammonia produced by the first catalyst unit. In the second catalyst unit, nitrogen oxides (NOx) present in the exhaust gas under lean exhaust conditions undergo a reduction reaction using the temporarily stored ammonia as a reducing agent. The exhaust gas treatment unit preferably contains a third catalyst unit that oxidizes lean exhaust gases prior to their entering the second catalyst unit. Processes that use the aforementioned gas treatment units are also provided.

The present invention will now be described in connection with preferred embodiments. These embodiments are presented to aid in an understanding of the present invention and are not intended to, and should not be construed, to limit the invention in any way. All alternatives, modifications and equivalents that may become obvious to those of ordinary skill upon reading the disclosure are included within the spirit and scope of the present invention. Further, this disclosure is not intended to be a treatise on exhaust gas treatment. Readers are referred to appropriate available texts on this subject as necessary.

According to the present invention the first catalyst unit is preferably a three-way catalyst. Three-way catalysts are well known to persons skilled in the art. Such catalysts generally contain, as the catalytically active component, a combination of noble metals from the platinum group (platinum, palladium, rhodium, iridium, ruthenium, osmium), which are deposited in a very fine distribution on high surface area support oxides such as, for example, aluminium oxide, aluminium silicate, silicon dioxide, titanium dioxide and zirconium oxide. The platinum group metals are used in different combinations. For example, trimetallic catalysts that contain platinum, palladium and rhodium are well known to persons skilled in the art. Bimetallic catalysts generally contain the combinations platinum/palladium, platinum/rhodium or palladium/rhodium and are also well known to persons skilled in the art. Three-way catalysts that have palladium as the sole noble metal from the platinum group are also well known to persons skilled in the art. Pure platinum or pure rhodium catalysts are not suitable as three-way catalysts. Furthermore, three-way catalysts always also contain oxygen-storing components that store oxygen under lean exhaust gas conditions and release it again in the presence of a rich exhaust gas composition. Cerium oxide and praseodymium oxide are usually used for this purpose.

Under rich exhaust gas conditions, ammonia ($NH_3$) is formed on the three-way converter catalyst, for example by reaction of hydrogen with nitrogen monoxide in accordance with the following chemical equation (i):

$$5\ H_2 + 2NO \leftrightharpoons 2NH_3 + 2H_2O \qquad (i)$$

The combustion process in the engine produces some of the hydrogen required for this reaction. Another source of hydrogen is the cerium content of the catalyst. As is well-known, cerium oxide catalyzes the water gas shift reaction (reaction of carbon monoxide with water to give hydrogen and carbon dioxide) under rich exhaust gas conditions and thus contributes to producing the hydrogen for forming ammonia in accordance with chemical equation (i). High temperatures favor the formation of ammonia. Temperatures above 300° C., in particular above 400° C. are preferred.

Suitable three-way catalysts for the purposes of this invention are described in patent documents DE 197 14 536 A1, DE 197 26 322 A1 and EP 1 046 423 A2, all of which are incorporated by reference herein.

For the second catalyst unit, preferably SCR catalysts are used. These catalysts, which are well known to persons skilled in the art, are able to catalyze the selective reaction of ammonia with the nitrogen oxides and oxygen present in the exhaust gas. Suitable catalysts for this purpose are known from, for example, denitrifying the waste gases of power stations, which are based on zeolite catalysts exchanged with the transition metals chromium, iron, nickel, copper, cerium, praseodymium, terbium or mixtures thereof or catalysts based on the solid acid systems $V_2O_5/TiO_2$ or $V_2O_5/WO_3/TiO_2$ or $V_2O_5/MoO_3/TiO_2$.

In addition to the aforementioned first catalyst unit and second catalyst unit, there is a third catalyst unit. The third catalyst unit facilitates the oxidation of nitrogen monoxide to nitrogen dioxide under lean exhaust gas conditions in accordance with chemical equation (ii) below. Preferably, a pure platinum catalyst on an aluminium oxide stabilized with silicon dioxide is used in the third catalyst unit. Formula (ii) reads:

$$2NO + O_2 \rightleftharpoons 2NO_2 \qquad (ii)$$

The equilibrium in accordance with equation (ii) lies on the right-hand side at low temperatures (below about 200° C.); the formation of nitrogen dioxide is thermodynamically favored in this temperature range. With increasing temperature, the thermodynamic equilibrium shifts in favor of nitrogen monoxide. At temperatures above 900° C., nitrogen dioxide decomposes almost completely to give nitrogen monoxide. Despite the thermodynamically advantageous conditions, due to kinetic problems, the formation of nitrogen dioxide at low temperatures is also low. Thus, with increasing temperature, the formation of nitrogen dioxide in accordance with equation (ii) passes through a pronounced maximum. The position and height of this maximum depend on the oxygen concentration in the exhaust gas and on the activity of the oxidation catalyst. For the conventional conditions present in the exhaust gas from lean-burn engines, the optimum conversion of nitrogen monoxide to nitrogen dioxide on an oxidation catalyst generally takes place in the range between about 200° C. and about 400° C. If the oxidation catalyst has a higher activity, the maximum is close to 200° C. and reaches higher values than for an oxidation catalyst with lower activity, for which the maximum for nitrogen dioxide formation is shifted to higher temperatures.

By using an exhaust gas treatment unit configured in accordance with the invention, one can obtain greatly improved conversions of nitrogen oxides. The reason for this is probably the optimum adjustment of the ratio by volume of nitrogen monoxide to nitrogen dioxide in the exhaust gas due to the additional oxidation catalyst.

The improvement in nitrogen oxide conversion could not be predicted because a corresponding increase in the proportion of nitrogen dioxide would be expected from the three-way catalyst. However, it was shown, under lean exhaust gas conditions, conventional three-way catalysts inadequately oxidize nitrogen monoxide to nitrogen dioxide. Furthermore, there is the risk that the ammonia formed by the three-way catalyst might be oxidized on passing over the oxidation catalyst before it can be stored on the SCR catalyst. However, in the present invention, this is not the case. The oxygen content of the exhaust gas from lean-burn engines in the rich phase of operation is so low that oxidation of the ammonia does not take place, or takes place only to a negligible extent.

A further improvement in exhaust gas treatment can be obtained when the first catalyst unit is located in a section of the exhaust gas system in which the exhaust gas temperatures favor the formation of ammonia in the presence of rich exhaust gas compositions, while the third catalyst unit is located in a section of the exhaust gas system in which the exhaust gas temperatures are optimized for the formation of nitrogen dioxide in the presence of lean exhaust gas compositions.

As explained above, the formation of ammonia is favored when the first catalyst unit has a temperature above 400° C. Thus, the first catalyst unit should be located as near to the engine as possible. At the same time, the formation of nitrogen dioxide on the three-way catalyst is suppressed by these high temperatures, in the presence of lean exhaust gas compositions, because the thermodynamic equilibrium between nitrogen monoxide and nitrogen dioxide favors the decomposition of nitrogen dioxide to give nitrogen monoxide and oxygen above about 350° C. to 400° C. Accordingly, the third catalyst unit should be located in a section of the exhaust gas system where the temperature of the exhaust gas is below about 450° C. to 400° C. in order to favor the formation of nitrogen dioxide. The temperatures mentioned here are only guidelines and depend, inter alia, on the activities of the catalysts used and the composition of the engine exhaust gas. A person skilled in the art can adjust these parameters in order to optimize the exhaust gas treatment by the exhaust gas treatment unit according to the invention.

The figures provide exemplary representations of the present invention and are described in detail below.

FIG. 1 shows the structure of an exhaust gas treatment unit according to one embodiment of the present invention. Reference numeral (1) denotes the internal combustion engine and reference numeral (2) denotes the exhaust gas pipe. The exhaust gas treatment unit consists of the three separate converter housings reference numerals (3), (4) and (5), in which are located the three catalysts units I, III and II, the first catalyst unit, the third catalyst unit, and the second catalyst unit respectively. Catalyst unit I is formed by a three-way catalyst. Catalyst unit III is formed by a platinum oxidation catalyst, catalyst unit II is formed by an SCR catalyst. Catalyst unit I is located just downstream of the engine. This ensures that the exhaust gas temperatures at this point are generally above 400° C. and thus favor the formation of ammonia under rich operation and suppress the formation of nitrogen dioxide under lean operation. Catalyst units III and II are introduced into the exhaust gas pipe further away from the engine. These two catalyst units are preferably mounted in the underfloor region of the motor vehicle. Due to the length of exhaust gas pipe between catalyst unit I and catalyst units III and II, the exhaust gas experiences cooling on its way to catalyst units III and II and this may be designed in such a way that the temperatures at catalyst unit III are within the optimum range for the formation of nitrogen dioxide.

Figure 2:
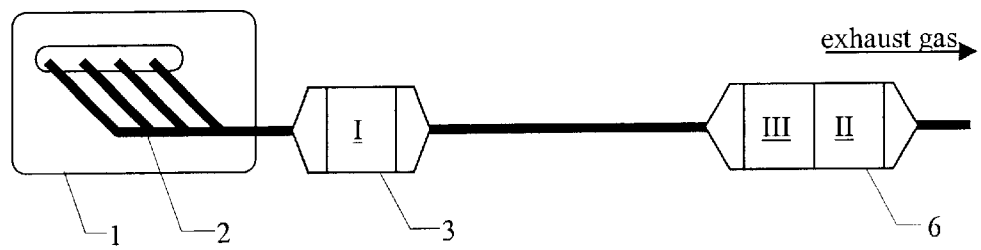
FIG. 2 illustrates an exhaust gas treatment unit with the catalyst units III and II arranged in a common housing.

FIG. 2 shows another embodiment of the exhaust gas treatment unit of the present invention. Catalyst units III and II, the third catalyst unit and the second catalyst unit respectively, are mounted in a common converter housing (6) in this case.

Figure 3:
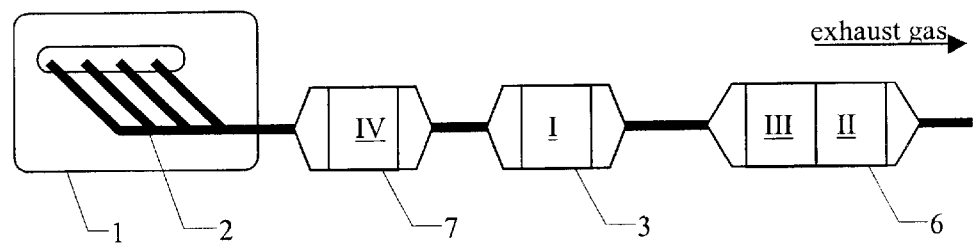
FIG. 3 illustrates an exhaust gas treatment unit like the one in FIG. 2 with an additional catalyst unit IV.

FIG. 3 shows another embodiment of the exhaust gas treatment unit of the present invention. In this case, a fourth catalyst unit, catalyst unit IV is introduced into the exhaust gas pipe upstream of catalyst unit I. Catalyst unit IV is formed by a nitrogen oxide storage catalyst, which temporarily stores the majority of the nitrogen oxides present in lean exhaust gas and releases the previously temporarily stored nitrogen oxides in the presence of a rich, exhaust gas composition. Catalysts of this type are disclosed in the prior art.

In another variant of the exhaust gas treatment unit according to the invention, another oxidation catalyst may be introduced into the exhaust gas pipe downstream of catalyst unit II in order to oxidize any ammonia slippage to nitrogen and water. This catalyst unit is referred to as the fifth catalyst unit.

As described by the specification above, for exhaust gas treatment units according to the invention, operating phases with different exhaust gas compositions are required for the efficient treatment of exhaust gases with this unit. During most of the engine-operating period, the engine is supplied with a lean air/fuel mixture. The exhaust gas then has a normalized air/fuel ratio $\lambda$ greater than 1. During these operating phases, the nitrogen oxides present in the exhaust gas pass through catalyst unit I, the first catalyst unit, almost unchanged. In contrast, in catalyst unit III, the third catalyst unit, the nitrogen monoxide present in the lean exhaust gas is partially oxidized to nitrogen dioxide, wherein the exhaust gas treatment unit may be designed in such a way that the ratio by volume of nitrogen monoxide to nitrogen dioxide after leaving catalyst unit III is between 3:1 and 1:3, preferably between 2:1 and 1:2 and in particular 1:1. Exhaust gas with this composition then passes into catalyst unit II, the second catalyst unit, after leaving catalyst unit III. Here the mixture of nitrogen monoxide and nitrogen dioxide is converted into nitrogen and water in a selective reduction reaction, with the consumption of ammonia previously stored in this catalyst unit.

To produce the ammonia required for selective reduction, operating phases of the engine with rich air/fuel mixtures ($\lambda<1$) are required. In these operating phases, ammonia is produced on the three-way catalyst. In the absence of a sufficient concentration of oxygen in the exhaust gas, the ammonia passes through the oxidation catalyst unharmed and is stored on the SCR catalyst.

The alternation between operating phases with lean and rich exhaust gas required for effective exhaust gas treatment is generally produced automatically during normal operation of the engine in a motor vehicle. Rich exhaust gas conditions are present during a cold start and during acceleration phases, whereas lean exhaust gas conditions are present when driving at constant speed. However, if the requisite alternation between operating states is no longer guaranteed, for example due to prolonged driving under lean exhaust gas conditions, operation can deliberately switched over to rich air/fuel mixtures at certain time intervals by the engine electronics in order also to ensure optimum exhaust gas treatment in these phases.

What is claimed is:

1. An exhaust gas treatment unit, said exhaust gas treatment unit comprises:
   a. a first catalyst unit, wherein said first catalyst unit comprises a three-way catalyst;
   b. a second catalyst unit, wherein said second catalyst unit is located downstream of the first catalyst unit and comprises an SCR-catalyst; and
   c. a third catalyst unit, wherein said third catalyst unit is located downstream of said first catalyst unit and upstream of said second catalyst unit, and said third catalyst unit is capable of oxidizing nitrogen oxide present in the exhaust gas at lean exhaust gas conditions so that from 25 to 75 vol. % of the nitrogen oxides entering the second catalyst unit are nitrogen dioxide.

2. An exhaust gas treatment unit according to claim 1, wherein the first catalyst unit is located in a section of the exhaust gas treatment unit in which the exhaust gas temperatures favor the formation of ammonia in the presence of rich exhaust gas compositions.

3. An exhaust gas treatment unit according to claim 2, wherein the third catalyst unit is located in a section of the exhaust gas treatment unit in which the exhaust gas temperatures favor the formation of nitrogen dioxide in the presence of lean exhaust gas compositions.

4. An exhaust gas treatment unit according to claim 1, further comprising a fourth catalyst unit wherein the fourth catalyst unit is located upstream of the first catalyst unit and is capable of temporarily storing nitrogen oxides present in the exhaust gas in the presence of a lean exhaust gas composition and releases the temporarily stored nitrogen oxides in the presence of rich exhaust gas compositions.

5. The exhaust gas treatment unit according to claim 4, further comprising a fifth catalyst unit, wherein said fifth catalyst unit comprises an oxidation catalyst and is located downstream of said second catalyst unit.

6. A process for treating an exhaust gas of a lean burn engine, wherein the lean burn engine is operated during most of the engine-operating period with a lean air/fuel mixture and is operated with a rich air/fuel mixture during acceleration phases or the air/fuel ration is deliberately switched over to rich values at certain time intervals, and wherein the exhaust gas is conducted over a first catalyst unit, a second catalyst unit and a third catalyst unit, the third catalyst unit being located downstream of said first catalyst unit and upstream of said second catalyst unit and the second catalyst unit containing an SCR-catalyst, said process comprising:
   a. generating ammonia by the first catalyst unit when the exhaust gas is rich;
   b. storing said ammonia of step (a) on the SCR-catalyst;
   c. oxidizing nitrogen oxides contained in the exhaust to form oxidized nitrogen oxides when the exhaust gas is lean; and
   d. exposing said oxidized nitrogen oxides to said second catalyst unit and selectively converting the oxidized nitrogen oxides to nitrogen and water by the ammonia stored on the SCR catalyst.

7. A process for treating exhaust gas according to claim 6, wherein the first catalyst unit comprises a three-way catalyst.

8. A process for treating exhaust gas according to claim 6, wherein the second catalyst unit comprises a three-way catalyst.

9. A process for treating exhaust gas according to claim 6, wherein the third catalyst unit oxidizes said nitrogen oxides under lean exhaust gas conditions such that between 25 vol. % and 75 vol. % of the nitrogen oxides entering the second catalyst unit are nitrogen dioxide.

10. A process according to claim 6, wherein the temperature in said first catalyst unit is greater than 300° C.

11. A process according to claim 6, wherein the temperature in said third catalyst unit is less than 450° C.

12. A process according to claim 6, wherein said nitrogen oxides that are exposed to said second catalyst unit are reduced by said ammonia of step (b).

13. A process according to claim 6, wherein said third catalyst unit is a platinum oxidation catalyst.

14. A process for treating an exhaust gas comprising the process of claim 6, and:
   a. reducing the oxidized nitrogen in the second catalyst unit to form nitrogen and water; and
   b. exposing the exhaust gas leaving the second catalyst unit to a fifth catalyst unit wherein said fifth catalyst unit comprises an oxidation catalyst and is located downstream of said second catalyst.

15. A process for treating an exhaust gas comprising:
   a. exposing a first lean exhaust gas comprised of nitrogen oxides to a fourth catalyst unit, wherein said fourth catalyst unit temporarily stores said nitrogen oxides;
   b. releasing said temporarily stored nitrogen oxides in the presence of rich exhaust gas composition;
   c. exposing said temporarily stored nitrogen oxides and said rich gas composition to a first catalyst unit to generate ammonia, wherein said first catalyst unit is located downstream of said fourth catalyst unit;

d. storing said ammonia of step (c) in a second catalyst unit, wherein said second catalyst unit is located downstream of said first catalyst unit;

e. exposing a second lean exhaust gas to a third catalyst unit located downstream of said first catalyst unit and upstream of said second catalyst unit, wherein said lean exhaust gas comprises nitrogen oxides;

f. oxidizing said nitrogen oxides of step (c) to form oxidized nitrogen oxides; and g. exposing said oxidized nitrogen oxides to said second catalyst unit.

16. A process for treating an exhaust gas comprising the process of claim 14, and:

c. reducing the oxidized nitrogen in the second catalyst unit to form nitrogen and water; and d. exposing the exhaust gas leaving the second catalyst unit to a fifth catalyst unit wherein said fifth catalyst unit comprises an oxidation catalyst and is located downstream of said second catalyst.

* * * * *